United States Patent [19]
Bidiville et al.

[11] Patent Number: 5,288,993
[45] Date of Patent: Feb. 22, 1994

[54] CURSOR POINTING DEVICE UTILIZING A PHOTODETECTOR ARRAY WITH TARGET BALL HAVING RANDOMLY DISTRIBUTED SPECKLES

[75] Inventors: Marc Bidiville; Javier Arreguit, both of Pully; Floris A. Van Shaik, Colombier; Bernard Steenis, Bevaix; Fabien Droz-Dit-Busset, Neuchatel; Harthmuth Buczek, Marin-Epagnier; Aldo Bussien, Aclens, all of Switzerland

[73] Assignee: Logitech, Inc., Fremont, Calif.

[21] Appl. No.: 956,907

[22] Filed: Oct. 5, 1992

[51] Int. Cl.⁵ ................................................ G01V 9/04
[52] U.S. Cl. ............................... 250/221; 250/231.13; 345/163
[58] Field of Search ................... 250/231.13, 221, 229, 250/231.12, 237 G, 231.18; 356/375; 340/710

[56] References Cited
U.S. PATENT DOCUMENTS
4,720,631 1/1988 Lapeyre .................... 250/237 G Primary Examiner—David C. Nelms
Attorney, Agent, or Firm—James E. Eakin

[57] ABSTRACT

A cursor control device for personal computers and workstations includes a randomly speckled ball illuminated with diffuse lighting. An image of at least a portion of the illuminated area of the speckled ball is focused by an optical element such as a diffractive optical element onto a photosensitive array. Logic associated with the photosensitive array determines movement of the ball across the array, and translates that movement into conventional cursor control signals supplied to a host system.

1 Claim, 8 Drawing Sheets

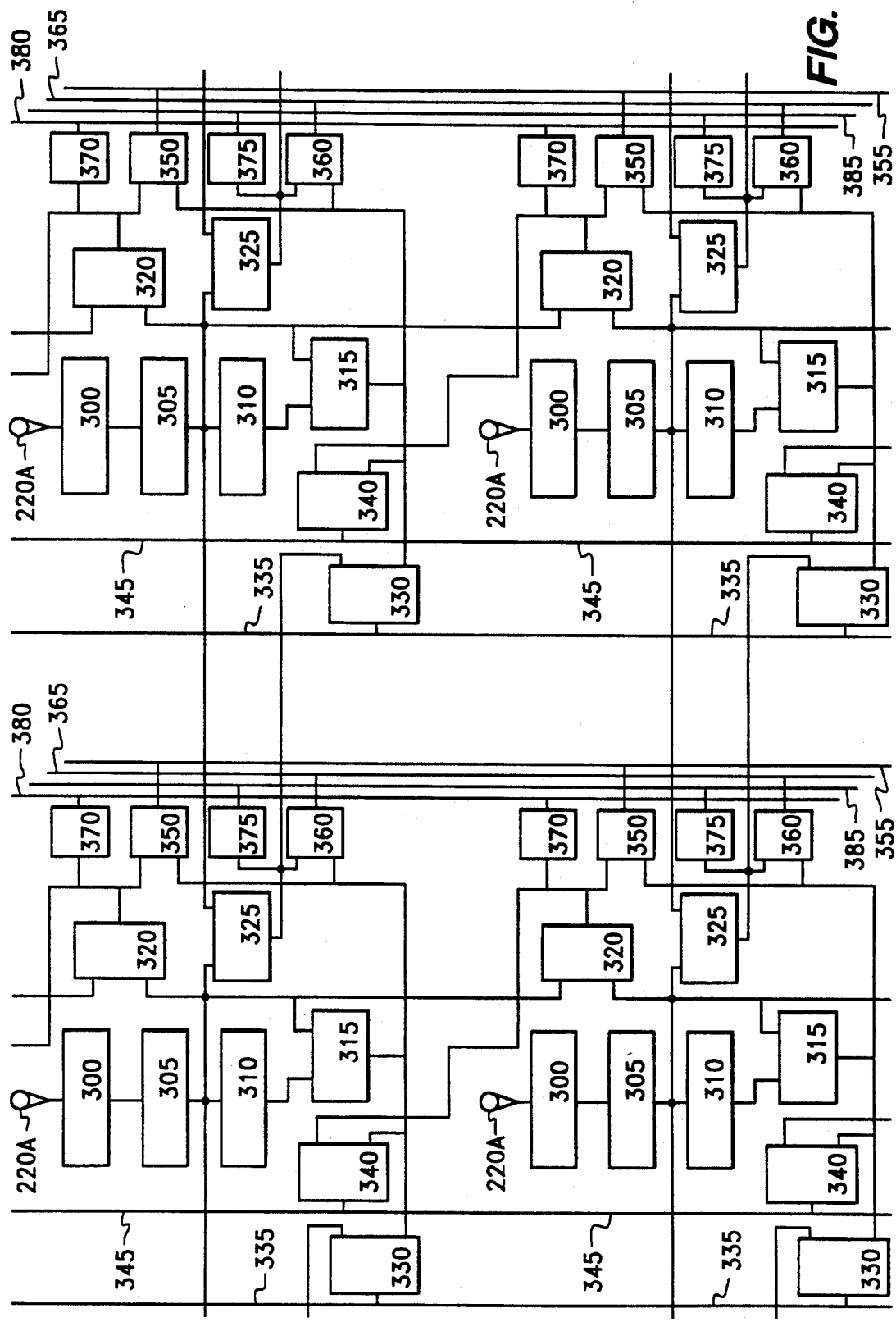

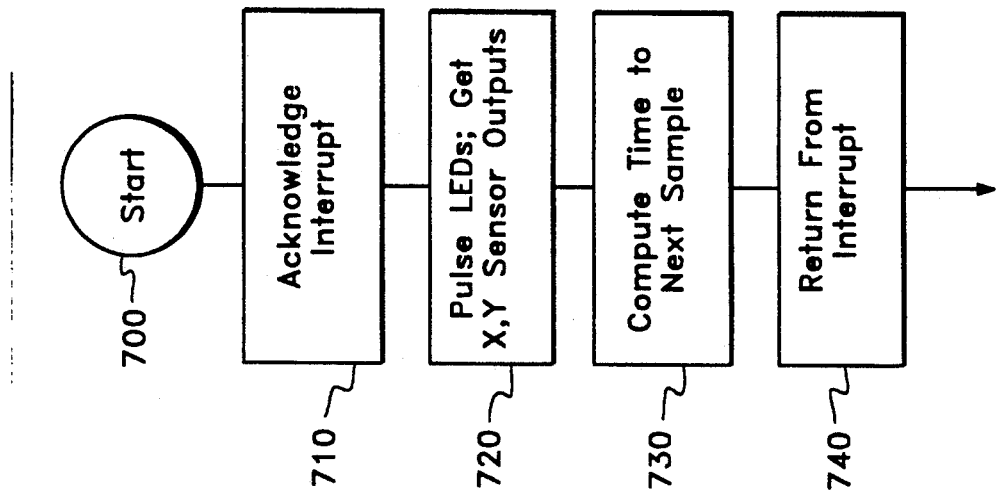
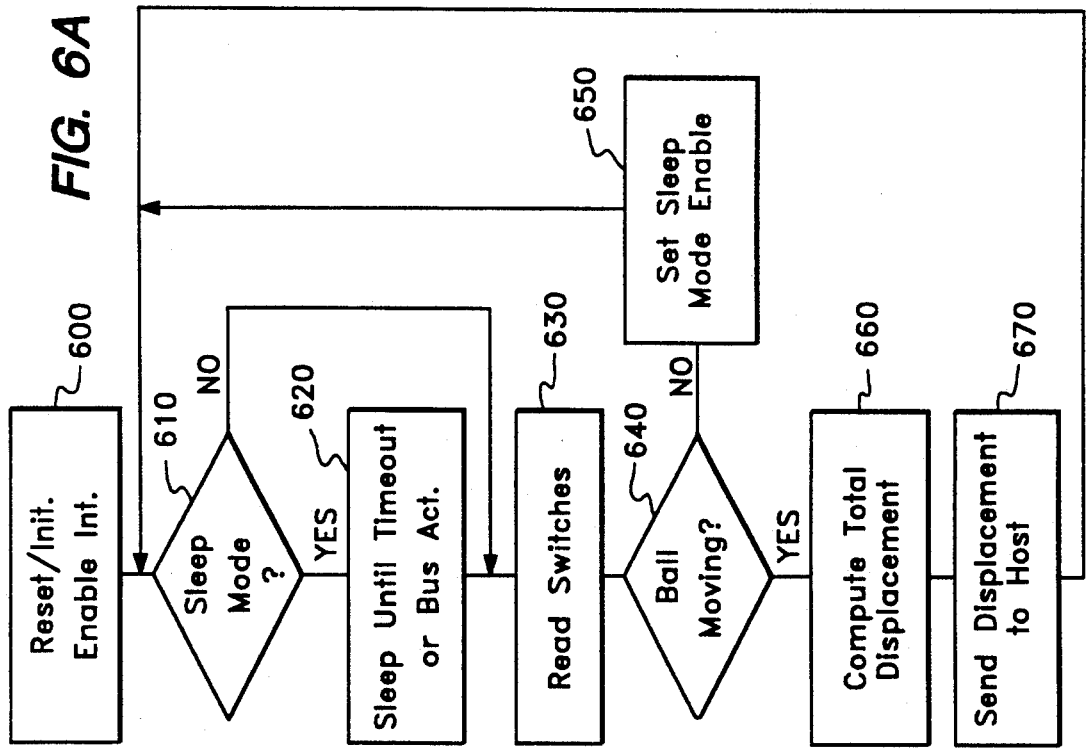

CURSOR POINTING DEVICE UTILIZING A PHOTODETECTOR ARRAY WITH TARGET BALL HAVING RANDOMLY DISTRIBUTED SPECKLES

FIELD OF THE INVENTION

The present invention relates to pointing devices for cursors on video display screens for personal computers and workstations, and more particularly relates to optical devices and methods for translating rotation of a ball into digital signals representative of such movement.

BACKGROUND OF THE INVENTION

Pointing devices, such as mice and trackballs, are well known peripherals for personal computers and workstations. Such pointing devices allow rapid relocation of the cursor on a display screen, and are useful in many text, database and graphical programs. Perhaps the most common form of pointing device is the electronic mouse; the second most common may well be the trackball.

With a mouse, the user controls the cursor by moving the mouse over a reference surface; the cursor moves a direction and distance proportional to the movement of the mouse. Although some electronic mice use reflectance of light over a reference pad, and others use a mechanical approach, most prior art mice use a ball which is on the underside of the mouse and rolls over the reference surface (such as a desktop) when the mouse is moved. In such a prior art device, the ball contacts a pair of shaft encoders and the rotation of the ball rotates the shaft encoders, which historically includes an encoding wheel having a plurality of slits therein. A light source, often an LED, is positioned on one side of the encoding wheel, while a photosensor, such as a phototransistor, is positioned substantially opposite the light source. Rotation of the encoding wheel therebetween causes a series of light pulses to be received by the photosensor, by which the rotational movement of the ball can be converted to a digital representation useable to move the cursor.

The optomechanical operation of a trackball is similar, although many structural differences exist. In a trackball, the device remains stationary while the user rotates the ball with the thumb, fingers or palm of the hand; one ergonomic trackball is shown in U.S. Pat. No. 5,122,654, assigned to the assignee of the present invention. As with the mouse, the ball in a conventional trackball typically engages a pair of shaft encoders having encoding wheels thereon. Associated with the encoding wheels are light sources and photosensors, which generate pulses when the movement of the ball causes rotation of the shaft encoders. One prior art trackball using this approach is shown in U.S. Pat. No. 5,008,528.

Although such a prior art approach has worked well for some time, with high quality mice and trackballs providing years of trouble-free use, the mechanical elements of such pointing devices necessarily limit the useful life of the device.

Additionally, in conventional electronic mice, a quadrature signal representative of the movement of the mouse is generated by the use of two pairs of LED's and photodetectors. However, the quality of the quadrature signal has often varied with the matching of the sensitivity of the photosensor to the light output of the LED. In many instances, this has required the expensive process of matching LED's and photodetectors prior to assembly. In addition, varying light outputs from the LED can create poor focus of light onto the sensor, and extreme sensitivity of photosensor output to the distance between the LED, the encoding wheel, and the photosensor.

There has therefore been a need for a photosensor which does not require matching to a particular LED or batch of LED's, while at the same time providing good response over varying LED-to-sensor distances.

In addition, many prior art mice involve the use of a mask in combination with an encoder wheel to properly distinguish rotation of the encoder wheel. Because such masks and encoder wheels are typically constructed of injection molded plastic, tolerances cannot be controlled to the precision of most semiconductor devices. This has led, effectively, to a mechanical upper limit imposed on the accuracy of the conventional optomechanical mouse, despite the fact that the forward path of software using such mice calls for the availability of ever-increasing resolution. There has therefore been a need for a cursor control device for which accuracy is not limited by the historical tolerances of injection molding.

SUMMARY OF THE INVENTION

The present invention substantially overcomes the foregoing limitations of the prior art by providing an optical sensing system which eliminates entirely the use of shaft encoders, the encoding wheels associated with shaft encoders, masks or other mechanical elements normally associated with optomechanical pointing devices. Although the present invention can be implemented with either a mouse or a trackball, the exemplary description hereinafter will discuss primarily a trackball implementation.

The present trackball employs a specially colored ball, having a random pattern of randomly sized (within a suitable range), randomly shaped spots in a color which contrasts with the background color, such as black spots on an otherwise white ball. One or more light sources, typically LED's, illuminate a portion of the ball with diffuse light and a portion of that light reflects onto a sensor array comprising a plurality of individual sensor elements to create an image of a portion of the ball. An optical element such as a lens or diffractive optical element may be provided to focus the image of the ball on the array. The signals generated by the array are then acted upon by logic and analog circuits, for example employing a neural network, such that the movement of the ball is converted into X and Y components for movement of the cursor on the video display. Except for the mechanical aspects of the ball itself, the electronic trackball of the present invention is entirely optical; when the ball is included, the trackball of the present invention may reasonably be thought of as an optomechanical pointing device. It will be apparent that the techniques used herein may readily be adapted to other types of pointing devices, particularly electronic mice.

It is therefore one object of the present invention to provide an optomechanical pointing device not requiring shaft encoders.

It is another object of the present invention to provide an electronic pointing device using analog or similar circuits, for example a neural network, to convert rotation of a ball into cursor control signals.

It is yet another object of the present invention to provide an electronic pointing device employing a random pattern of randomly sized and shaped spots on a ball in combination with an optical array to provide signals for generating cursor control signals.

It is a still further object of the present invention to provide an electronic pointing device using a diffused light source in combination with an optical element and a photosensitive array to provide signals for generating cursor control signals.

These and other objects of the present invention may be better appreciated from the following detailed description of the invention, taken in combination with the accompanying Figures.

THE FIGURES

FIG. 4 shows an array of four of the block diagrams of FIG. 3, thus showing the interrelationship between the pixels.

FIGS. 6A-6B show in flow diagram form the operation of the firmware which controls the logic of FIGS. 3 and 4.

DETAILED DESCRIPTION OF THE INVENTION

Figure 1:
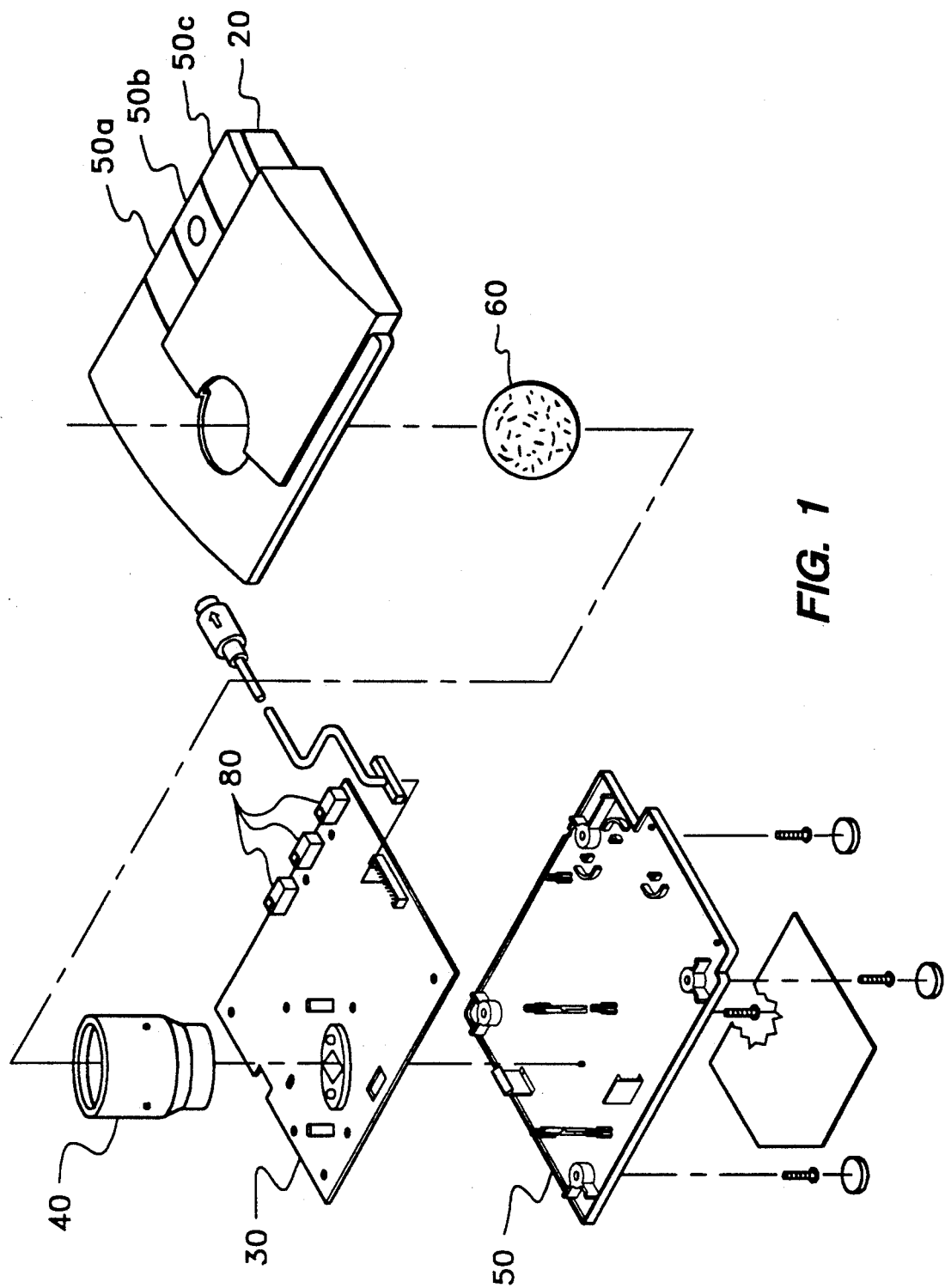
FIG. 1 shows in exploded view an electronic trackball according to the present invention.

Referring first to FIG. 1, an electronic pointing device, and in particular an electronic trackball 10, is shown in exploded perspective view. The trackball 10 includes an upper housing 20, a printed circuit board 30 close to which a ball cage 40 is juxtaposed, a lower housing 50, a ball 60, and a plurality of buttons 70 located on the upper housing 20 which actuate associated switches 80. The switches 80 are normally located on the circuit board 30. The ball cage 40 typically is mounted on the PCB 30, although in some instances it can be mounted on a housing member.

Figure 3:
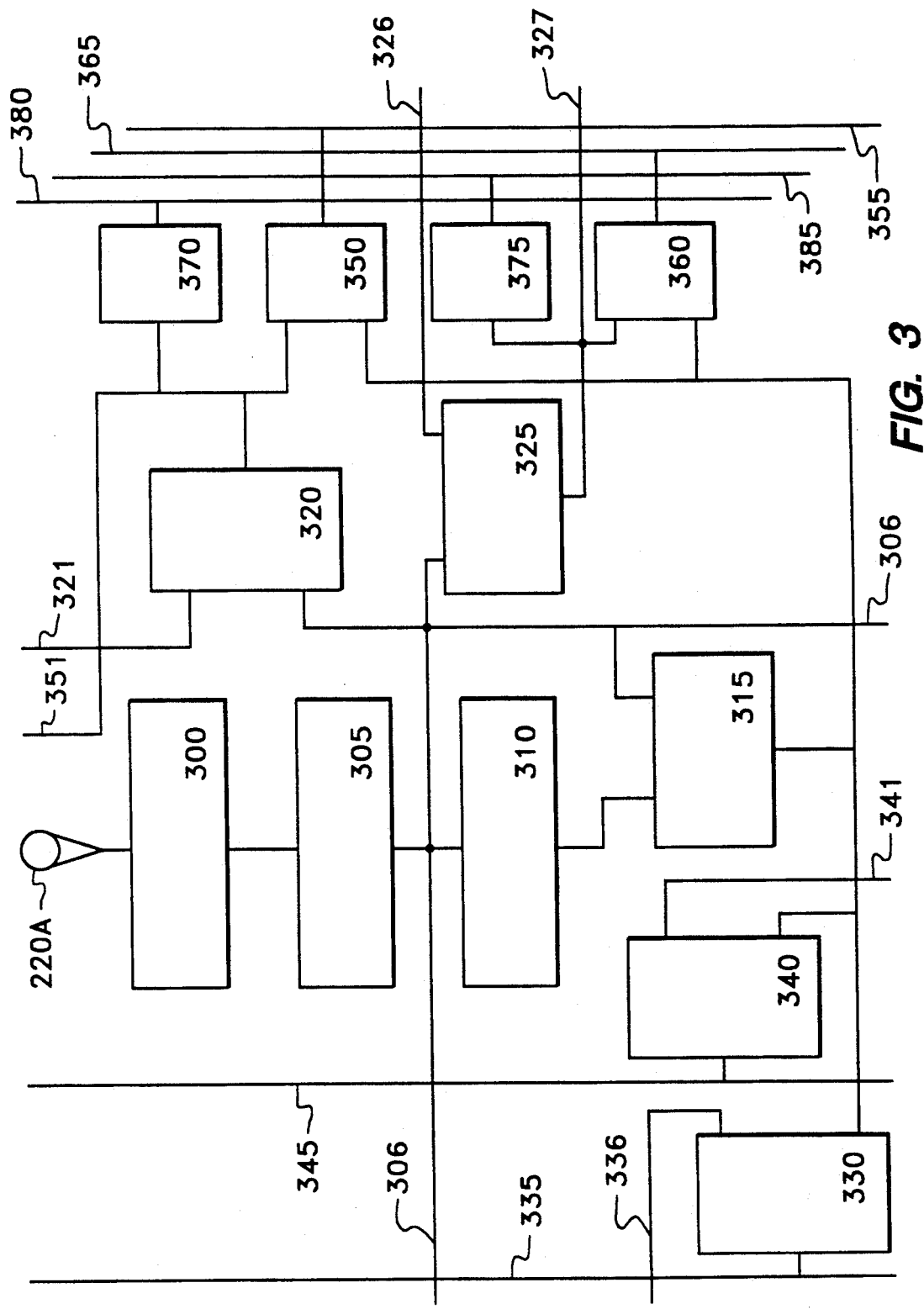
FIG. 3 shows in schematic block diagram form the circuitry of a single pixel according to the present invention.

The printed circuit board 30 includes circuitry for operating on the signals provided by a sensor and associated logic (see FIGS. 3 and 4). Thus, movement of the ball in the trackball is in turn converted into digital signals which control the cursor on the screen of an associated personal computer, terminal or workstation. In serial port pointing devices, the printed circuit board will typically include a microprocessor and related driver circuitry for sending and receiving standard serial communications, such as RS232 signals. Alternatively, the signals provided by the mouse will be compatible with PS/2 ports.

Figure 2A:
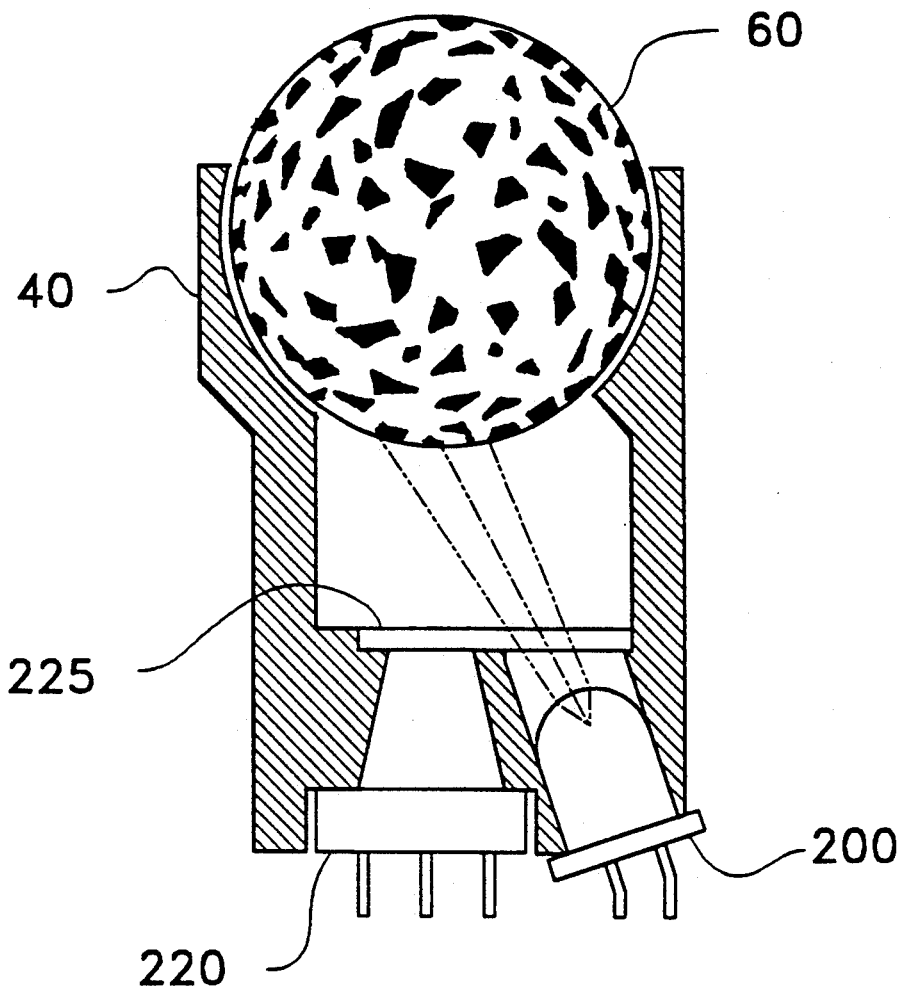
FIG. 2A shows a generalized cross-sectional side view of the ball cage and ball of the present invention.

Referring next to FIG. 2A, a ball cage 40 (shown in cross-section) and a ball 60 according to the present invention are shown. As will be immediately appreciated by those skilled in the art, the combination of ball 60 and ball cage 40 are markedly different from the prior art and form a key aspect of the present invention. In particular, the ball 60 can be seen to have a plurality of randomly shaped markings thereon in a color which contrasts with the background, such that the overall effect is a randomly speckled ball. A typical ball may, for example, have black spots on an otherwise white ball, although many other color combinations would be acceptable. The randomly shaped markings or spots are randomly arranged on the ball, although the markings are within a predetermined suitable range. Thus, the markings typically with range in size from 0.5 mm$^2$ to 0.7 mm$^2$, with a density of about one spot per square millimeter. In an exemplary embodiment, the ball may be on the order of 10 mm in diameter, although the diameter could range from 5 mm to larger than 20 mm. At present, it appears that the size of spot is relatively independent of the diameter of the ball.

Figure 2B:
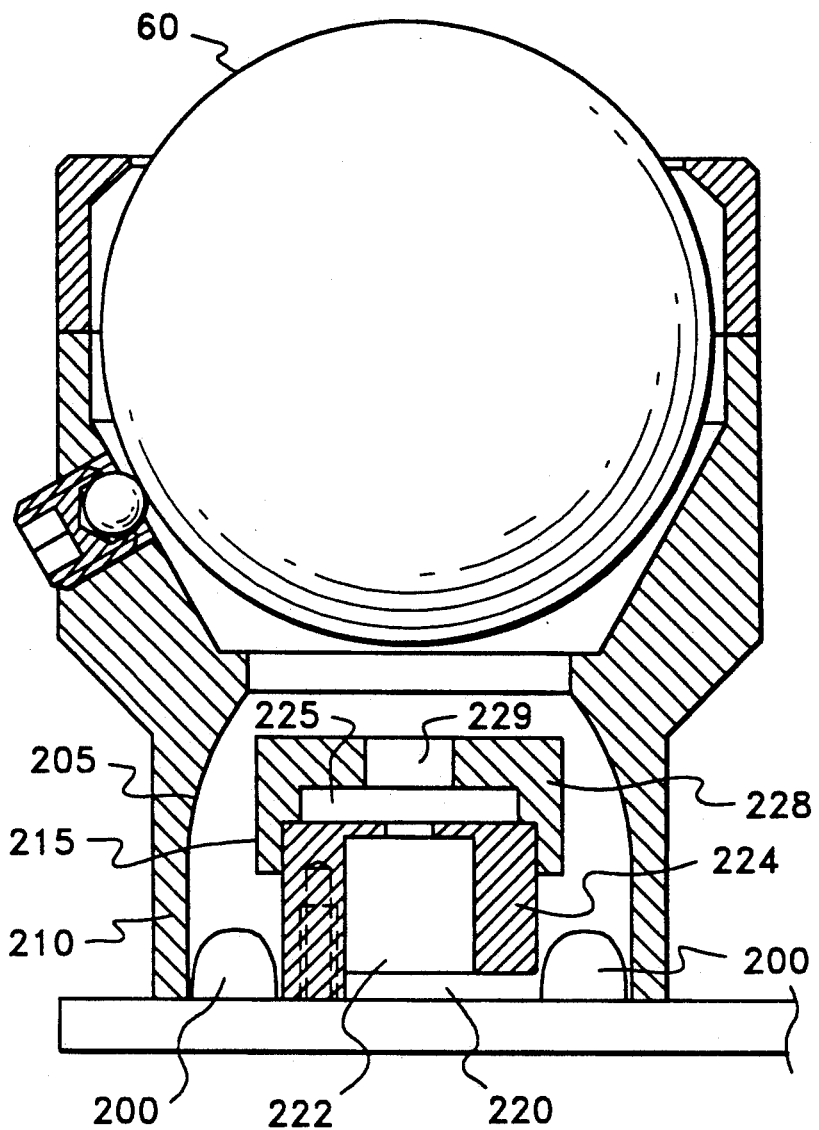
FIG. 2B shows a more detailed cross-sectional side view of the ball cage and ball of the present invention, including light paths.

In addition, and as can be better appreciated from FIG. 2B which shows a more detailed cross-sectional view of the ball and ball cage taken along the centerlines thereof, the ball cage 40 includes at least one (FIG. 2A), and in some cases two or more (FIG. 2B), light sources 200 such as an LED, which produces light that impinges on the ball 60. The LED or other light source may include an integrally formed lens. The light from the light sources 200 is preferably reflected off the inside surface 205 of the outer wall 210 of the ball cage 40, and is partially blocked by an interior wall 215 from striking directly the ball 60. The inside surface 205 may be, for example, the inside surface of a sphere. In this manner the light from the light sources 200 is distributed relatively uniformly across a predetermined portion of the ball, while at the same time the light is caused to strike the ball obliquely, providing diffuse illumination of the ball.

The ball is maintained in a rotatable position by a plurality of supports 150, which may for example be rollers of a conventional type, or may be jeweled bearing surfaces of the type disclosed in U.S. patent application Ser. No. 07/820,500, entitled Bearing Support for a Trackball, and filed Jan. 14, 1992 and assigned to the same assignee as the present invention, incorporated herein by reference. Although only one such roller is shown in FIG. 2B because of the view shown, a plurality, typically three, such rollers are provided to ensure uniform support for the ball 60.

A removable cover may be provided in some embodiments to permit readily insertion and removal of the ball 60; while such is removable cover is at present believed preferable, to permit cleaning of the ball and the inside of the pointing device, in at least some embodiments such a removable cover is unnecessary.

A photodetector array 220 is located centrally between the light sources 200 in a chamber 22 formed within a housing 224. A portion of the relatively diffuse light which strikes the ball 60 is reflected into the array 220 through an optical element 225. The result is that an image of at least a portion of the illuminated surface of the ball is formed on the array 220. In an important distinction from prior art optomechanical mice, the ball cage includes no shaft encoders, nor does it include the matched light source and photodetector typical of prior optomechanical mice. The optical element 225 is typically fixed in location between the housing 224 and an aperture housing 228 of which the interior wall 215 forms the outside surface. An aperture 229 is provided in the aperture housing 228 to permit the diffuse light reflected off the ball 60 to reach the optical element 225, and then the photosensitive array 220.

Figure 5A:
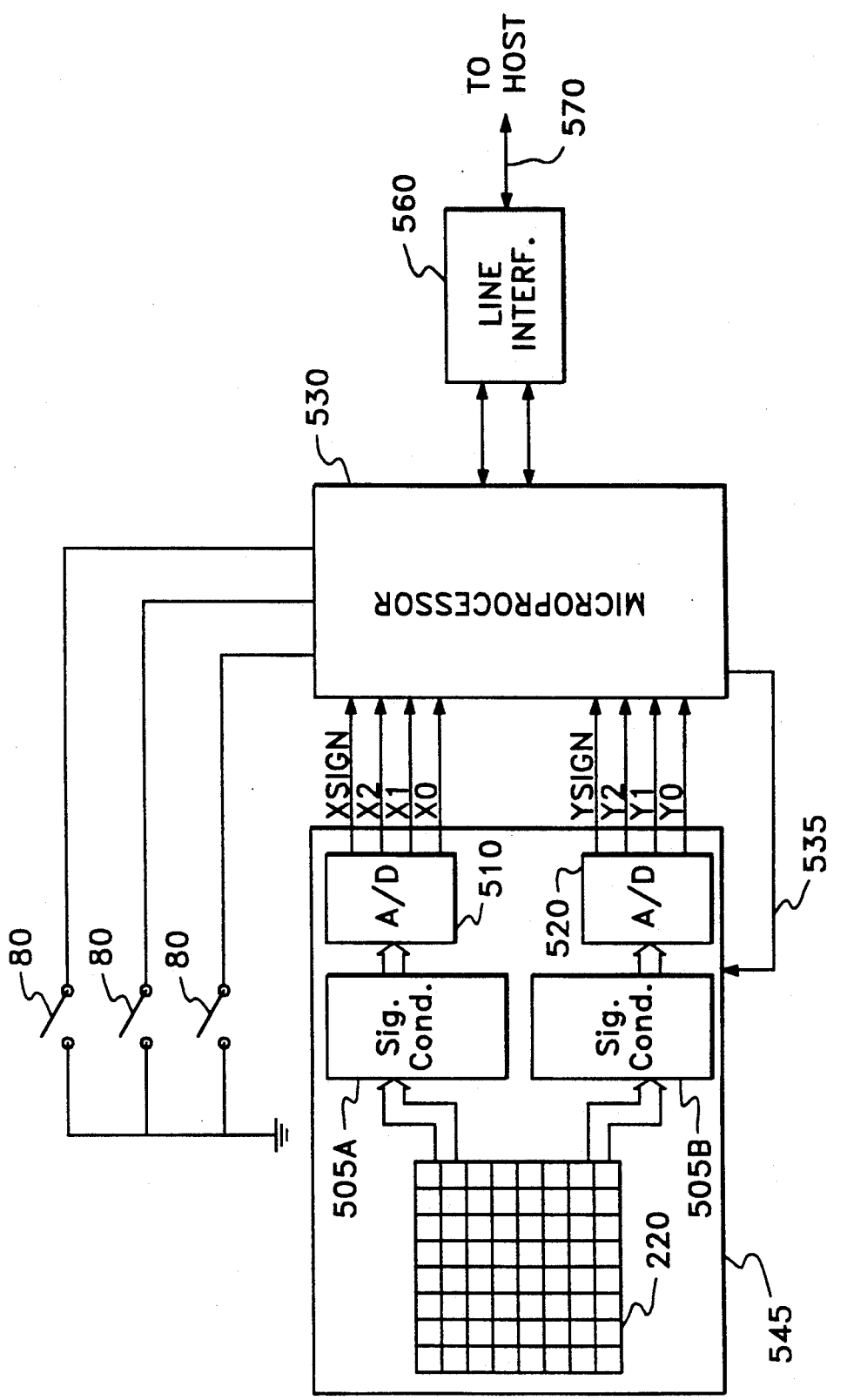
FIG. 5A shows in schematic block diagram form the circuitry used for cursor control in the present invention.

The photodetector array 220 will typically range in overall size from 2×2 mm to 7×7 mm, with each detector segment, or pixel, 220A-220n having dimensions in the range of 100×100 μm to 200×200 μm (where the exact number is determined by the size of the overall array and the size of the individual detector). As will be discussed hereinafter in connection with FIGS. 3 and 4, in at least the preferred embodiment of the invention, each pixel includes a photodetector element and associated circuitry for conditioning the output of the photodetector element into a signal useable external to the array. The diameter of the ball area used for detection corresponds to the diagonal of the square detector field, and thus determines the maximum field angle to be covered by the optics. In an exemplary embodiment, a typical ball area diameter viewable for detection may be on the order of 2.8 mm, which represents a square field of 2×2 mm², and the array 220 may comprise a matrix of 8×8 detectors 220A-n. Although a square array of detectors has been implemented (substantially as shown in FIG. 5A), in at least some embodiments it may be preferable to arrange the individual detectors in a circle or hexagon. Depending upon the application, the detectors may be arranged across the area of the element, or may be positioned around the circumference, such as the circumference of a circle.

In addition, it is important to maximize the amount of diffuse light energy reflected off the ball 60 and reaching the detector array 220, and in particular each particular detector element 220A-n. Although a wide range of magnifications is workable, a magnification of −1 is preferable to minimize the effects of mechanical tolerances. In addition, because of the small size, expense, and required modulation transfer, conventional lenses are unsatisfactory in at least the presently preferred embodiments. Instead, diffractive optical elements (DOE's) are preferable, although applications exist where other optical elements would be acceptable, such as physically larger implementations.

In particular, DOE's can provide the required light transfer while at the same time being fabricated by means of relatively conventional lithographic and etching methods known from microelectronics fabrication which fit into the normal manufacturing processes for fabricating the detector array itself, thus keeping additional costs to a minimum.

Additionally, aspherical functionality can be readily provided in a DOE at virtually no additional expense, and provides desirable light transfer capabilities although it does involve a more complicated design effort. In addition, different optical functions may be included in the same DOE, so that a portion of the DOE substrate can be fabricated with a first microstructure which directs the illumination cone from a light source at the appropriate incidence angle onto the ball surface, and a second microstructure which acts as an aspheric lens for pattern imaging, so that the image of the ball illuminated by the first microstructure is properly focused on the array 220 by the second microstructure. Although such multiple DOE structures are attractive for at least some embodiments of the present invention, in the generally preferred arrangement a DOE is used only for imaging the illuminated area of the speckled ball 60 onto the array 220.

In such an exemplary embodiment, the focal length of the DOE is on the order of 2.4 mm where the total ball-to-detector array distance is on the order of 10 mm. The aperture diameter is on the order of 1-1.5 mm, or a numerical aperture (NA) on the order of 0.1. In addition, because the magnification is −1, the DOE is located midway between the ball 60 and the detector array 220.

As with other optomechanical mice, the motion to be detected corresponds either to two translations (x,y), or one translation and one rotation about the center of the image. Additionally, for power consumption reasons, the LED's are pulsed in the manner described in U.S. patent application Ser. No. 07/717,187, filed Jun. 18, 1991, and entitled Low Power Optoelectronic Device and Method, meaning that the photodetectors 220A-N can only detect a series of "snapshots" of the ball. Finally, the output of the detector array 220 preferably is compatible with a microprocessor input so that the signal can be readily converted to control of a cursor. For example, the output could conform to the type of output provided by designs employing optical encoders, such as described in U.S. Pat. No. 5,008,528, and would result in a two-bit quadrature code of about 15 impulsions per millimeter of ball displacement.

The circuitry for operating on the output signals received from the detector array 220 can be better understood by reference to FIG. 3, although FIG. 3 shows photodetector and logic comprising only a single pixel. Similar logic exists for each pixel 200A-n in the detector array (a four pixel array is shown in FIG. 4), with the end result being a collective computation for the array as a whole. In an exemplary embodiment, the detector array 220 and the associated logic arrays of the type shown in FIG. 3 are all implemented on a single die, and in particular the individual detector and associated circuit elements formed on the same pixel.

As a general explanation of the operation of the circuits of FIGS. 3 and 4, the basic function of the algorithm is the correlation of spatial intensity differences (referred to as "edges") and temporal intensity changes ("tics"). Referring particularly to FIG. 3, a photodetector 220A such as a reverse biased photodiode generates a current proportional to the intensity of the light reflected off the ball onto the detector 220A. The current is compared with a threshold by a threshold circuit 300, to decide whether the pixel is white or black. The threshold can be adjusted differently for different sensor zones, such as to compensate for uneven lighting; such adjustment can be made automatically or otherwise, depending on application. Alternatively, a differential circuit, based on the signals from neighboring cells, can be used to reduce sensitivity to variations in lighting intensity, ball speckle density, and so on.

The output of the threshold circuit 300 is then supplied to a first memory 305, which stores the state of the threshold circuit and allows the LED to be switched off without losing the illumination value of the image. The first memory 305, which may be either a flip-flop or a latch, thus may be thought of as a one-bit sample and hold circuit. More particularly, on the appropriate phase of the clock signal, for example when the clock signal is high, the output of the threshold circuit 300 is copied into the memory, and that value is frozen into memory when the clock signal goes low. A second memory 310, also typically a flip-flop or latch, stores the old state of the memory 305 in a similar manner, and thus the output of the second memory 310 is equal to the output of the first memory 305 at the end of the previous clock cycle. The clock cycle is, in an exemplary embodiment, synchronized with the LED pulse, with the active edge being at the end of the light pulse. The old state of the memory is supplied to the pixels below and on the left through a "CURRENT STATE" bus 306.

The temporal intensity change ("tic") of a pixel can thus be determined by comparing the states of the first and second memories 305 and 310, respectively. This comparison is performed by comparator logic 315. In addition, the output of the first memory 305 is provided to two additional comparators 320 and 325 to detect edges on the top and at the right, respectively. The comparator 320 also receives information on a line 321 about the current state of the pixel above in the array. The comparator 325 receives information from the pixel on the right through a line 326, or "EDGE ON RIGHT" bus, and supplies information to the pixel on the right through a line 327. The comparators 315, 320 and 325 may each be implemented as Exclusive-Or circuits for simplicity.

Edges at the left and bottom are communicated to this pixel by the pixels at the left and on the bottom, respectively, as can be better appreciated from the portion of the array shown in FIG. 4. More specifically, as with reference to FIG. 3, the corresponding pixel circuits will inject a current on an associated wire if a tic and a corresponding edge is detected with the result being that edges at the left and bottom are deducted from the values of the corresponding neighboring pixels. Similarly, the detection of a horizontal or vertical edge is signaled by injecting a current on the corresponding wire. Thus, left correlator logic circuit 330 receives information on a line 335 from what may be thought of as a "MOVE LEFT" bus, and also receives information from the adjacent pixel on a line 336, which may be thought of as an "EDGE ON LEFT" bus. Down correlator logic 340 receives information on a line 345 from a "MOVE DOWN" bus, and also from a line 341, supplied from the pixel below as an "EDGE ON BOTTOM" bus. In contrast, up correlator logic 350 receives one input from the circuit 330 and a second input on a line 351, or "EDGE ON TOP" bus, and provides a signal on a line 355, or a "MOVE UP" bus; right correlator logic 360 provides a signal on a "MOVE RIGHT" bus 365. The correlator circuits may be thought of simply as AND gates.

In addition, a pair of switched current sources, 370 and 375, provide a calibrated current injection onto respective busses 380 and 385, when edges are detected; the current source 370 receives its sole input from the EDGE ON TOP bus 351. Thus, when a horizontal edge is detected moving vertically, the current source 370 provides a calibrated current injection on line 380; similarly, when a vertical edge is detected moving horizontally, the current source 375 provides a calibrated current injection on line 385. The lines 321, 326, 336 and 341 are all tied to false logic levels at the edges of the array.

Referring again to FIG. 4, the implementation of a four pixel array can be better appreciated, and in particular the manner in which the correlator circuits 330, 340, 350 and 360 tie into adjacent pixel logic can be better understood. Similarly, the manner in which the vertical and horizontal edge detectors 370 and 375 cooperate with adjacent pixels can be better appreciated. In an exemplary embodiment, an 8×8 matrix of pixels and associated logic has been found suitable, although many other array sizes will be acceptable in particular applications. In addition, the 8×8 array is, in an exemplary embodiment, comprised of four 4×4 quadrants. Each quadrant is provided with its own outputs for the four directions of displacement, to permit calculation of displacement to be performed. It will be appreciated that, basically, six bus lines are provided, with the output of each pixel tied to one output line. In essence, the function of the circuits of FIGS. 3 and 4 is that each pixel 200A-n can either drive a preset amount of current onto the associated bus ("ON"), or do nothing. By the use of very precise current drivers, it is then possible to sum the respective currents on each of the busses and determine the number of pixels that are on the bus. The six busses give six numbers, and the six numbers are combined to compute X and Y displacements. In a presently preferred embodiment, X and Y displacements can be calculated as:

$$dX = [\#right - \#left]/\#edges(Horizontal) detected,$$

while $$dY = [\#right - \#left]/\#edges(Vertical) detected.$$

The difference between the right and left moves (the dividend in the above fractions) is easily implemented with a differential amplifier using inverting and non-inverting inputs, as will be better appreciated in connection with FIG. 5B, discussed below.

Referring next to FIG. 5A, a generalized schematic block diagram is shown in which the array 220 is connected to the remaining circuitry necessary for operation as a trackball. The array 220 is connected through signal conditioning logic 505A-B to A/D converters 510 and 520 to a microprocessor 530. The A/D converter 510 supplies lines X0, X1 and X2, as well as the sign of the X movement, to the microprocessor on lines 540; likewise, A/D converter 520 supplies lines Y0, Y1 and Y2, as well as the sign of the Y movement, to the microprocessor on lines 550. Switches 80 supply additional control inputs to the microprocessor 530. The microprocessor provides a clock signal on line 535 to the array and associated circuits, indicated generally at 545, which may for example be implemented on a single chip. The microprocessor 530 then communicates bidirectionally with line interface logic 560, and the output of the line interface logic 560 provides cursor control signals in conventional form to a host system, not shown, over an output bus 570. It will be appreciated by those skilled in the art that, in the embodiment detailed herein, the microprocessor 530 is used primarily for establishing the protocol for communications with the host, although it does also control LED pulsing and generation of interrupts.

Figure 5B:
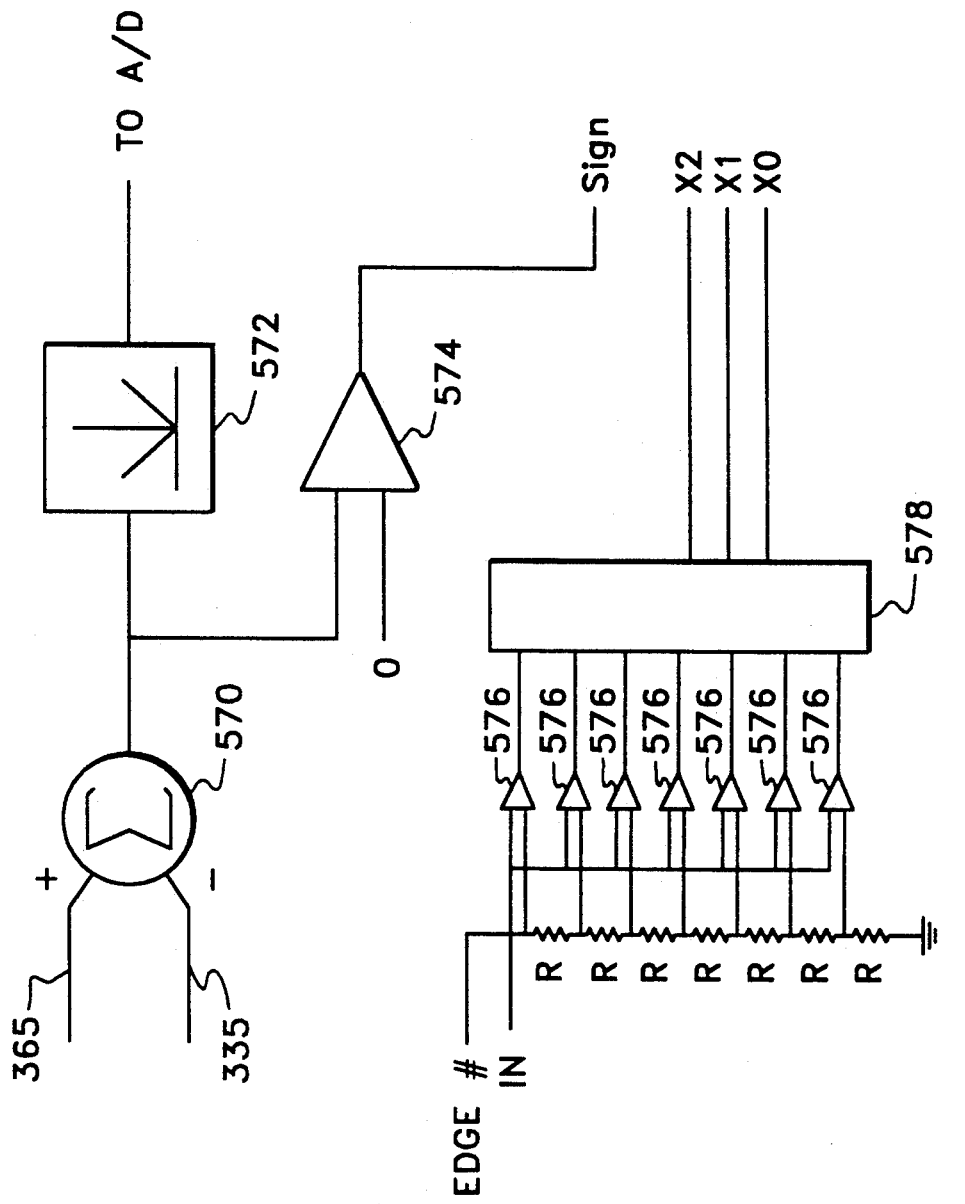
FIG. 5B shows in schematic block diagram form the signal conditioning circuitry of FIG. 5A.

With reference next to FIG. 5B, the signal conditioning circuits 505A-B shown in FIG. 5 can be better understood. For convenience, only the X (horizontal move) signal conditioning circuit is shown in detail; the corresponding Y (vertical move) circuit is functionally identical. As previously noted, the cumulative current signals from the various pixels are summed on their respective busses. These sums of such currents from the "move left" and "move right" busses are subtracted in summing circuit 570, followed by determination of the absolute value in an absolute value circuit 572, after which the absolute value is provided to the A/D converter 510. In addition, sign of the move is determined by providing the output of the summing circuit 570 to a comparator 574. Finally, the sum of the edge currents is compared through a series of comparators 576, the outputs of which are fed to combinational logic 578, and thence provided as X0-X2 outputs. It should also be noted that the A/D conversion of circuits 510 and 520 can be readily implemented using a flash A/D converter. Division can be similarly implemented with a flash A/D converter by using a reference voltage proportional to the bus current for the horizontal (or vertical) edges. Use of current sources for such circuitry provides desirable simplicity and compactness.

Referring next to FIGS. 6A and 6B, the operating program which controls the microprocessor 530 can be better appreciated. Referring first to FIG. 6A, the operation of the system of FIGS. 1-5 begins at step 600 by resetting and initializing the logic, and enabling interupts. A check is made at step 610 to determine whether the sleep mode has been enabled.

If sleep mode is enabled, reflecting no recent movement of the ball of the trackball, the logic of FIGS. 3-5 sleeps at step 620 until the timeout or the occurence of bus activity, whichever occurs first. The occurence of sleep modes is discussed in U.S. Pat. application Ser. No. 07/672,090, filed Mar. 19, 1991 and assigned to the same assignee as the present invention, the relevant portions of which are incorporated herein by reference. If sleep mode is not enabled, or if a timeout or bus activity has occurred, the switches 80 on the trackball are read at step 630. After the switches are read, a check is made at step 640 to see whether the ball is moving. If not, sleep mode is enabled at step 650.

If the ball is moving, the total displacement is computed at step 660. Following computation of the displacement, the data is provided as an output to the host system at step 670, and the process loops back to step 610.

Referring next to FIG. 6B, the interrupt service routine of the present invention can be better understood. The interrupt service routine is accessed at step 700 whenever a timer function from the microprocessor generates an interrupt, although other methods of generating an interrupt at regular intervals are also acceptable in at least some embodiments. The system responds by acknowledging the interrupt at step 710, followed at step 720 by pulsing the LEDs and sampling the sensor outputs for X and Y. At step 730 the time before a next sample is to be taken is calculated. The amount of time can vary, depending upon whether the displacement of the ball since the last sample is large or small; for example, a sampling rate of once per millisecond is typical during normal movement, with less frequent sampling when the ball is stopped. If the displacement is small, the time between successive samples is increased; if the displacement is large, the time between samples is decreased. In a presently preferred implementation, a "small" displacement represents a movement on the order of $1/400^{th}$ of an inch or less; a "large" displacement will range between $5/800^{th}$ and $7/800^{th}$ of an inch. After computing the time until the next sample, the system returns from the interrupt at step 740.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. The A cursor pointing device for controlling the position of a cursor on a display for a personal computer or workstation comprising
   a ball of a first color having speckles thereon of a color contrasting to the first color and which are randomly distributed on the ball,
   light source means for flooding a portion of the ball with diffuse light,
   sensor means responsive to diffuse light reflected from the speckled ball and impinging thereon for creating an output,
   optical means for creating an image of an illuminated portion of the ball on the sensor means,
   processing means responsive to the output from the sensor means for generating a cursor control output.

* * * * *